US010909520B2

(12) United States Patent
Tutte et al.

(10) Patent No.: US 10,909,520 B2
(45) Date of Patent: Feb. 2, 2021

(54) SERVER FOR PROCESSING A TAB FOR A CUSTOMER AT A MERCHANT PREMISES

(71) Applicant: Mastercard International Incorporated, Purchase, NY (US)

(72) Inventors: Ramson Tutte, Kildare (IE); Ishfaq Lone, Dublin (IE); Marcia Mora, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 223 days.

(21) Appl. No.: 16/009,361

(22) Filed: Jun. 15, 2018

(65) Prior Publication Data

US 2018/0365671 A1    Dec. 20, 2018

(30) Foreign Application Priority Data

Jun. 16, 2017    (EP) .................................. 17176422

(51) Int. Cl.
| | |
|---|---|
| *G06Q 20/20* | (2012.01) |
| *G06Q 50/12* | (2012.01) |
| *G06Q 20/38* | (2012.01) |
| *G06Q 30/06* | (2012.01) |

(52) U.S. Cl.
CPC ......... *G06Q 20/208* (2013.01); *G06Q 20/385* (2013.01); *G06Q 30/06* (2013.01); *G06Q 30/0633* (2013.01); *G06Q 50/12* (2013.01)

(58) Field of Classification Search
CPC .... G06Q 20/208; G06Q 20/385; G06Q 30/06; G06Q 30/0633; G06Q 50/12
See application file for complete search history.

(56) References Cited

U.S. PATENT DOCUMENTS

2009/0063312 A1    3/2009  Hurst
2014/0244409 A1 *  8/2014  Nathanel ................ G06Q 50/12
                                                                705/15

FOREIGN PATENT DOCUMENTS

WO    2013/029095 A1    3/2013

OTHER PUBLICATIONS

Extended European Search Report for European Patent Application No. 1716422.8, dated Aug. 25, 2017, 10 pages.
International Search Report and Written Opinion for International Patent Application No. PCT/US2018/032621, dated Jun. 29, 2018, 13 pages.

* cited by examiner

*Primary Examiner* — Fahd A Obeid
*Assistant Examiner* — Michael Jared Walker
(74) *Attorney, Agent, or Firm* — Jordan IP Law, LLC

(57) ABSTRACT

A server to process a tab for a customer at a merchant premises may provide a list of candidate merchant premises to a customer mobile device, receive a signal indicating a user selection of one of the candidate merchant premises, receive payment card details for the customer mobile device, obtain a specific code for a tab at the selected merchant premises, send to the customer mobile device the specific code, receive a signal from a Point of Sale (POS) terminal of the selected merchant premises, associate the customer mobile device with an open tab maintained by the POS terminal, receive from the POS terminal at least one identifier and amount for each purchase of the open tab, request payment of at least a portion of a balance of the open tab from a payment gateway using the payment card details, and notify the POS terminal of the payment.

17 Claims, 5 Drawing Sheets

SERVER FOR PROCESSING A TAB FOR A CUSTOMER AT A MERCHANT PREMISES

CROSS-REFERENCE TO RELATED APPLICATIONS

This application claims the benefit of and priority to European Patent Application No. 17176422.8, filed Jun. 16, 2017, the contents of which is incorporated herein by reference in its entirety.

FIELD

The present invention relates to a server for processing a tab for a customer at a merchant premises.

BACKGROUND

U.S. Pat. No. 9,477,995, Quick Check Ltd providers of MyCheck, discloses a pay-at-table (PAT) system allowing a customer to perform self-checkout at a real-world non-virtual store or restaurant or other business establishment that the customer is visiting. The customer pre-defines an electronic payment method. The customer visits the business establishment, and the system generates a unique user-specific code that is a function of the time, the location, and the specific customer. The code is displayed on the mobile device of the customer, which is then shown to an employee of the business establishment, who then enters the unique code into a Point of Sale (POS) terminal; thereby generating an association between an ongoing open tab of the customer, and the mobile device of the customer. The customer is able to perform self-checkout of the open tab, without requiring action on behalf of the business establishment.

Referring to FIG. 1, Qkr is a PAT system from Mastercard and is implemented in with an application server 10 which interacts with an application installed on a customer device 12 as well as a POS terminal in a merchant premises. The customer device 12 is typically a smartphone or similar device running an application downloaded from an app store such as are provided to users of Apple iOS or Android devices.

Again, when the customer wishes to order, they open the application on their device 12 and select the merchant or specific merchant premises from a menu, for example, as shown in FIG. 4. Typically, the menu of available merchants is provided from the server 10 to the customer device 12 application as a function of the location of the customer device 12 to limit the number of choices for the customer and to make them relevant. Once the customer selects the merchant premises, they are provided with a specific code, for example, a 4 digit code such as shown in FIG. 6, which they provide to a waiter when they enter the merchant premises. The waiter now enters the code into an application running on a Point of Sale (POS) device 14 in the merchant premises. The information can be entered directly by the waiter on a central POS device 14 in the merchant premises; or the waiter may be equipped with a mobile device which communicates with a central POS device 14 in the merchant premises. Nonetheless, once the waiter associates the user's code with a tab for a table in the premises in the POS application, the POS 14 can now notify the Qkr server 10 of any orders for the table entered by the waiter through the POS application and keep a running total of the customer's orders. The Qkr server 10 can provide this information to the customer device 12 so that the application can display the customer's orders and running total for the customer.

Using a PAT application such as Qkr, the customer can close out their order whenever they wish—even after leaving the merchant premises. One way to do so is for the user to select a payment card whose details can be retrieved by the Qkr server 10 from the customer's electronic wallet, in this case, Masterpass from Mastercard. The payment card details can comprise a 16- or 19-digit Primary Account Number (PAN), expiry date and Card Verification Code (CVC) for a customer payment card; or alternatively a Virtual Card Number (VCN) for example, for a limited use card; or a payment token can be provided.

In any case, the payment details can be provided by the Qkr server 10 to a payment gateway 18 such as provided by Mastercard, Stripe etc. If the payment is accepted, the Qkr server 10 can close off the tab and provide a receipt for payment to the customer device 12.

It will be appreciated that in such scenarios, as in real-world scenarios where a customer only proffers their card after availing of a service, customers at times may not make a payment. While this may be motivated by fraudulent reasons as in real-world scenarios, this may also happen because customers expect a PAT system to automatically charge them, as other applications for example taxi applications may do.

It is of course desirable for merchants to be able to charge customers in such a scenario, but one particular problem which needs to be overcome is that the application server 10 needs to inter-operate with a number of different forms of POS and POS application.

From the perspective of the server 10, POS systems generally fall into three categories:

Category A: The POS 14 makes calls to the server 10. The POS 14 never accepts calls from the server 10 or any 3rd parties Category B: The POS 14 receives calls from the server 10. The POS 14 never makes calls to the server 10 or any 3rd parties.

Category C: The POS 14 makes calls to the server 10 and at times receives calls from the server 10.

Although, having to do so for a variety of different POS systems such as those provided by Comtrex Systems, it is possible to re-engineer POS systems of category A and C so that they can make a call to the server 10 to close off a tab where the customer has left the premises without paying. Note that in this case, the server 10 might then have to secure the customer's selection of a payment card and authorisation to complete the transaction and this could involve significant re-working of the reconciliation systems for any given POS system with which the server 10 is to inter-operate while waiting for this selection/authorisation—especially if customers were reluctant to provide this.

This would still not solve the problem for POS systems in category B such as those provided by Micros Systems Inc. (now known as Oracle Hospitality).

It is an object of the present invention to mitigate these problems.

SUMMARY

According to one aspect of the present invention, there is provided a server for processing a tab for a customer at a merchant premises according to claim 1.

In a second aspect there is provided a server for processing a tab for a customer at a merchant premises according to claim 3.

In a third aspect there is provided a POS terminal according to claim 11.

In a fourth aspect there is provided a POS terminal according to claim 12.

BRIEF DESCRIPTION OF THE DRAWINGS

Embodiments of the invention will now be described, by way of example, with reference to the accompanying drawings, in which.

DESCRIPTION OF THE EMBODIMENTS

Figure 1:
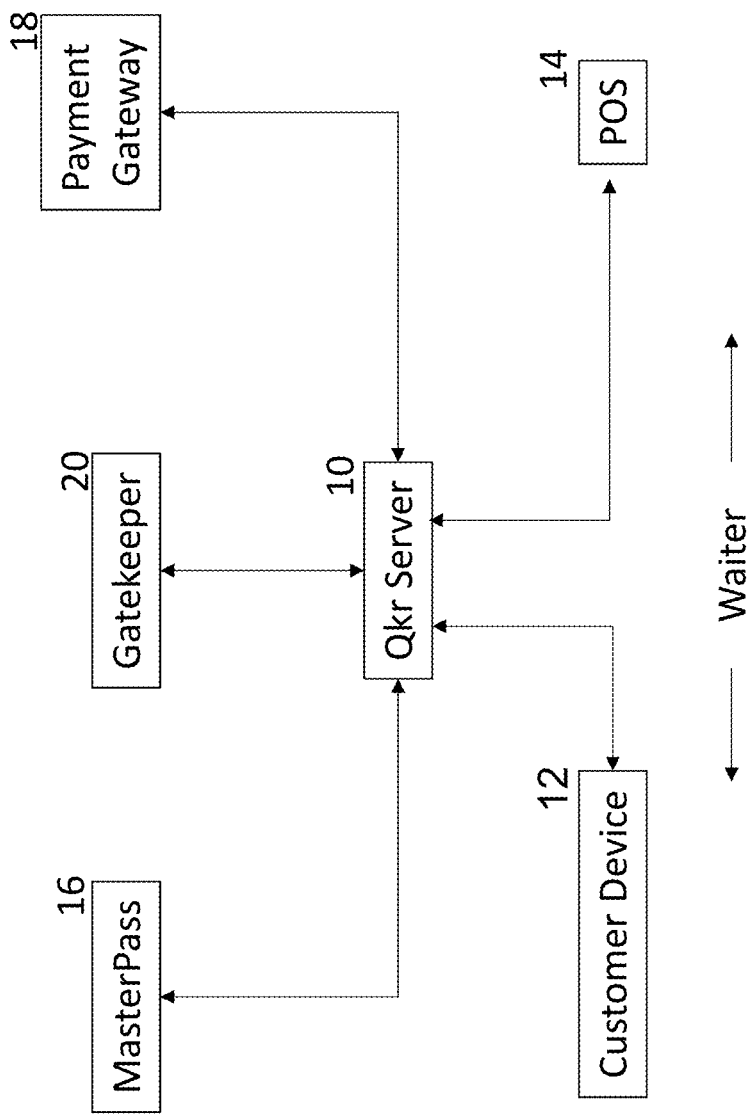
FIG. 1 is a schematic diagram illustrating the components involved in a payment processing system according to an embodiment of the invention.
Figure 2:
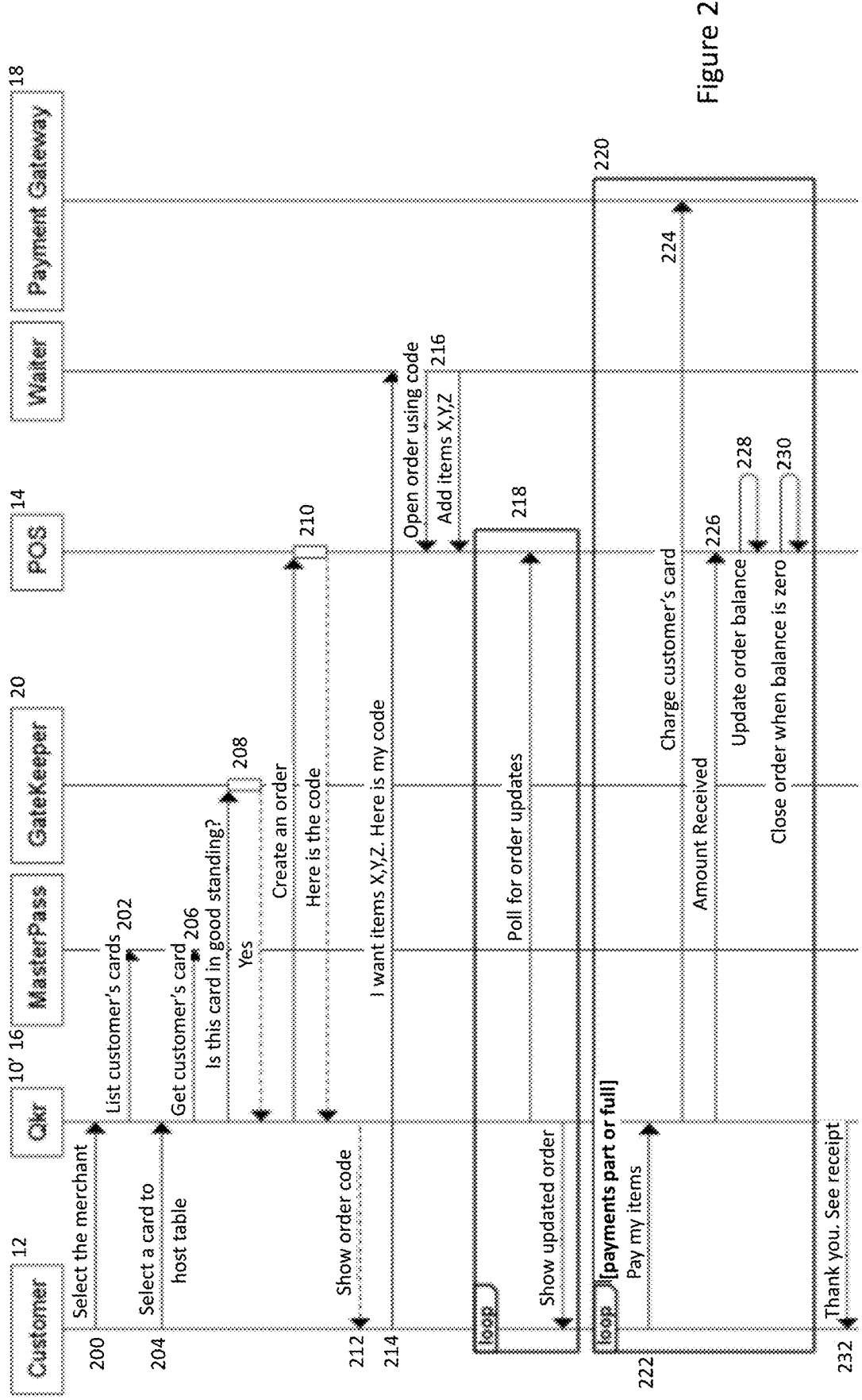
FIG. 2 is a diagram illustrating a first method flow performed in the system of FIG. 1.
Figure 4:
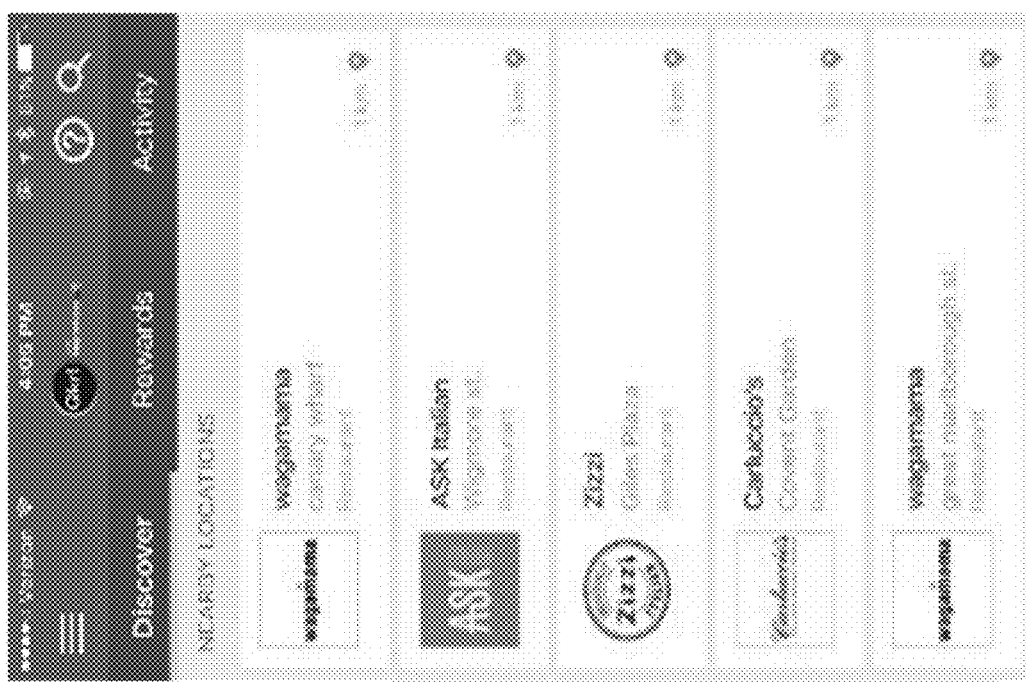

Referring now to FIG. 2, in an embodiment of the present invention, a customer using a PAT application on device 12 selects a merchant from a menu of possible merchants, such as shown in FIG. 4, as in existing implementations of the Qkr application, step 200.

However, as part of this process, the application now prompts the user to indicate if they are willing to be billed automatically in the event that they do not initiate payment from their device 12. If the customer agrees, the Qkr server 10' obtains the user's payment card details. This could be performed manually with the user entering card details, but in the present application, this is performed by the Qkr server 10' first requesting a list of customer's cards from an electronic wallet for example, of the type provided by Masterpass from Mastercard, step 202.

The Masterpass server 16 returns a list of cards to the Qkr server 10' which in turn presents these to the user for selection, step 204. Once a card has been selected by the user, the Qkr server 10' then requests the details for the card from the Masterpass server 16, step 206. As before, the payment card details can comprise a 16- or 19-digit Primary Account Number (PAN), expiry date and Card Verification Code (CVC) for a customer payment card; or alternatively a Virtual Card Number (VCN) for example, for a limited use card; or a payment token can be provided.

The Qkr server 10' can now check if the card details are valid by sending a request to a gatekeeper server 20 for example of the type provided by Mastercard or Kount, step 208. Gatekeeper servers are designed to prevent credit card fraud by enabling a merchant to check whether or not a card is valid. They essentially comprise a rules based engine for identifying fraudulent or potentially invalid payment card use and/or databases which can store lists of lost, blocked or stolen payment cards. These rules can include rules for analysing whether a payment card of a particular type, even though valid, can be accepted by a given merchant.

Figure 3:
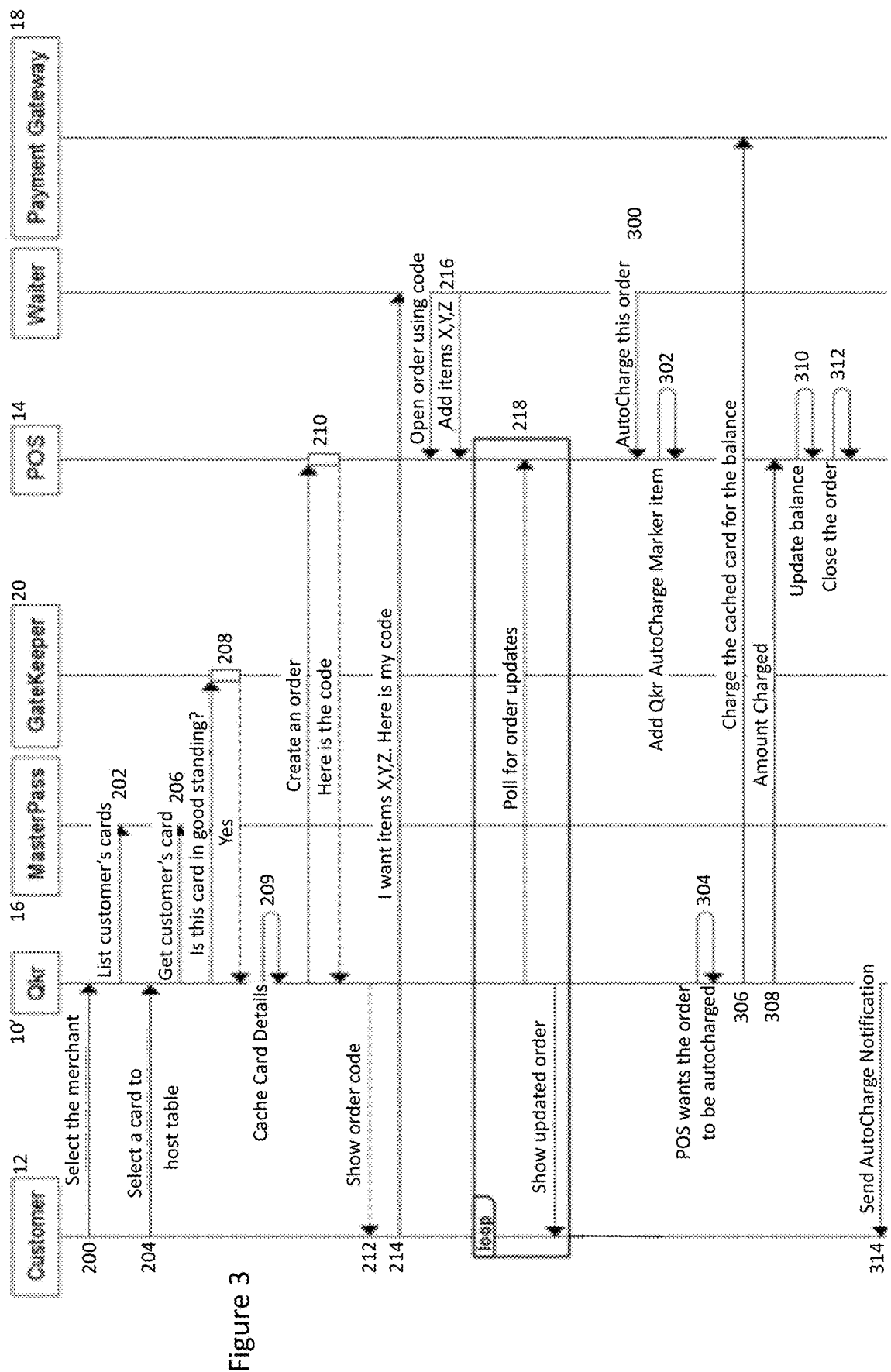
FIG. 3 is a flow diagram illustrating a second method flow performed in the system of FIG. 1.

In any case, if the gatekeeper server 20 indicates the selected payment card is valid, the process can continue with the Qkr server having cached the payment card details (not shown in FIG. 2, step 209 in FIG. 3). Otherwise, the user needs to return to step 202/204 to select another card.

Note that while validating a payment card in advance of providing a service represents a reversal of the normal manner in which real-world payments are performed, it does not in itself solve the problem identified above where payment is not initiated by a user of the customer device 12.

In addition to or as an alternative to card validation using the gatekeeper server 20, it is also possible at this stage for the Qkr server 10' to pre-authorise an amount to be charged to the payment card with a payment gateway—so improving the chances of a successful payment in due course.

In any case, the procedure can now continue as before with the Qkr server 10' signalling to the POS 14 that an order is to be created. A code is then generated and this is shared between the POS 14 and Qkr server 10', step 210. Note that the code can be generated either on the POS 14 or the Qkr server 10'. The code can comprise a 4 digit code as described above, but it will also be seen that codes of any length, alpha-numeric codes or codes such as Quick Response (QR) codes to be displayed on the customer device 12 and which can be scanned by a scanner of the POS device 14 (or a client of the POS device 14) can be employed.

In the example of FIG. 2, the POS 14 is of a category B type where it is polled/interrupted by the Qkr server 10'. However, it will be seen that these steps can equally be performed by the POS 14 polling/interrupting the Qkr server 10'.

Figure 6:
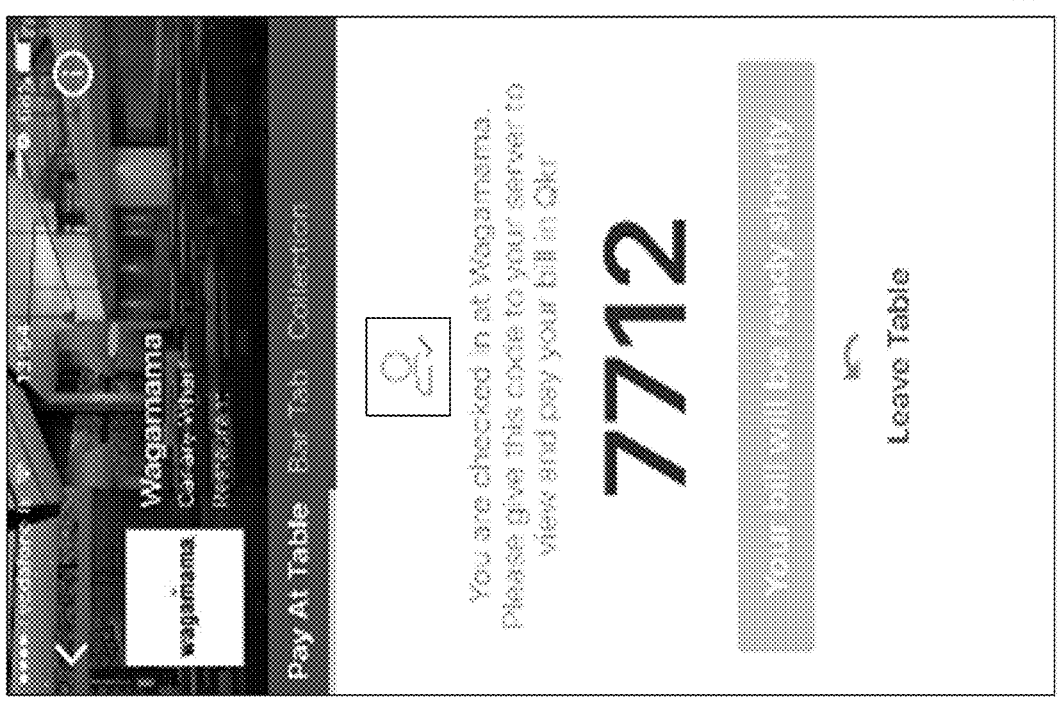

The Qkr server 10' now provides the code to the customer device 12, step 212 and when the user is in the merchant premises and engages a waiter/server, they can now communicate the code along with their order (items X,Y,Z) to the waiter, by showing them a screen display such as illustrated in FIG. 6, step 214.

The waiter can now either using a hand-held device in communication with the POS 14 or directly using the POS 14 enter the code, and the order, step 216.

Again in this case, because a Category B POS 14 is being employed, the Qkr server 10' continually polls/interrupts the POS 14 for order updates and provides to respective customer devices details of any updates received from the POS 14 where these can be displayed for the customer. In some implementations this polling functionality can be performed by a dedicated server which notifies the core Qkr server 10' when it detects any changes to an order at a POS 14.

At any time, the customer can decide they wish to pay their bill—either partly or fully—by selecting a payment option on the customer device application, step 222.

In response to receiving the payment request, the Qkr server 10', with the payment card details obtained previously at step 206, can connect to a payment gateway 18 to request payment for the amount selected by the user, step 224.

If the payment is authorised, the Qkr server 10' can notify the POS 14, step 226, and the paid amount can be deducted by the POS 14 from the order total, step 228. If the order balance is now zero, the waiter can close off the order, step 230.

As indicated, steps 222-230 can be repeated until and order balance is zero.

Figure 5:
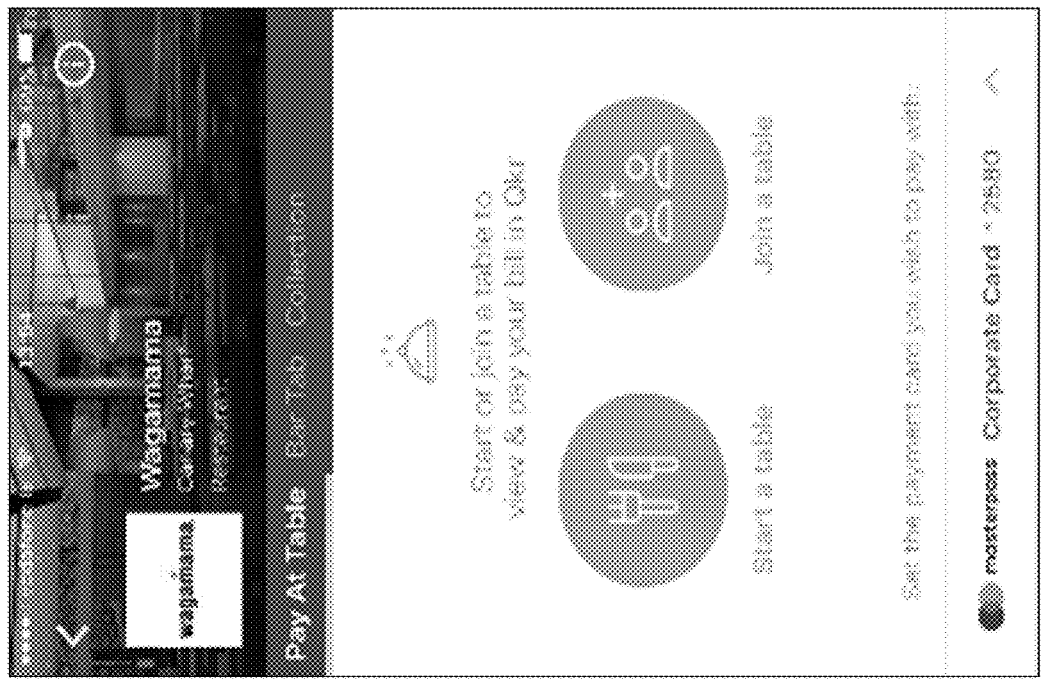
FIGS. 4 to 7 are screen grabs of a customer device application employed within the methods of FIGS. 2 and 3.

Although not mentioned above, where the customer is starting a tab, another option available for within the customer device PAT application is to join a table, see FIG. 5.

In this case, steps 200-209 can be as before, however, instead of a new code being generated, the customer joining a table can enter the code provided to the original customer who established the order as described for steps 210-212.

This means that loop 220 can be performed not alone repeatedly by a given customers, but by a number of different customers until an order balance is zero.

In any case, once an order balance is zero, the Qkr server 10' can provide a receipt to the customer device(s) 12 associated with the order, step 232.

Turning now to FIG. 3, which illustrates process flow in the event that a customer decides not to initiate a payment or not to pay fully for an order.

In this case, steps 200-218 are as before and are not described further.

Now, when a waiter sees that a customer has left the premises without paying (fully) for their order, the waiter can initiate automatic charging of the order, step 300.

In the present application automatic charging need not be implemented with dedicated functionality, as this would require different implementation for each type of POS.

Instead (or possibly as well as), the application is based on the observation that POS systems are generally based on providing a user interface displaying menu items for selection by a waiter, each item having an associated charge, so that when a menu item is selected for a given table, it is added to the order for the table.

In embodiments of the present invention, a menu item labelled "Automatic Charge" or equivalent is made available to a waiter (or manager) for any given table within the POS application UI. The menu item is associated with a special identifier, for example, "QkrAutoCharge" and with a specific amount, in this example, "0.00"—as this has no effect on the amount of the bill. It will be appreciated nonetheless that the specific amount can be a null value or indeed any value that does not have an effect on the amount of the bill, for example, an amount so large that it would not be treated as valid.

When such a UI menu item is selected and added to the order, step 302, regardless of the category of POS 14 being employed, it will be picked up by the Qkr Server 10' either in response to polling/interrupting a category B type POS 14 or in response to a category A or C type POS actively indicating the order update to the Qkr Server 10'.

Now when the Qkr Server 10' identifies an order item containing the special identifier "QkrAutoCharge" with the specific amount 0.00, step 304, the Qkr server 10' can attempt to charge the card selected by the original customer at step 204 for the balance remaining on the order using gateway 18, step 306.

If the payment is authorised by the gateway 18, the Qkr server 10' can notify the POS 14 that the payment has been made, step 308, and the amount can be used to update the balance for the order, step 310.

If the balance is zero, the order can be closed, step 312 and an autocharge notification can be provided to the customer device(s) associated with the order as before, step 314.

Note that the flows of FIGS. 2 and 3 can occur during processing a given tab where a customer or customers only part pay a balance on a tab. Thus, if the flow of FIG. 2 stops with an outstanding balance on a tab after one or more customers have only part paid a tab, then the card for the customer who originally created the tab (rather than just joining a table) can be auto-charged for the balance of the tab, by performing steps 300-314.

Note that this approach means that steps 202-209 need not be performed in advance for customers who join a table. However, if they are, this means that if automatic charging, step 306, is not successful using the payment details for the original customer, it would be possible for the Qkr Server 10' to continue by attempting to secure payment using the details/authorisation cached for each customer joining a table.

It will be appreciated that while the above method protects merchants from customers who do not pay for goods/services, it may also be necessary to control and/or monitor merchants' use of automatic charging. Thus, the Qkr Server 10' can monitor the use of automatic charging by merchants and if for example, more than a threshold number of automatic charging requests are made by a merchant in a given period, they may be denied use of the facility. Similarly if an automatic charge request is made by a merchant too long after an order had been initiated, step 210, they may be denied use of the facility.

It will be seen that one advantage of the above described approach is that it can be implemented on all categories of POS device listed above, without requiring any re-engineering of the underlying POS software. Nonetheless, the solution is particularly beneficial for Category B type POS systems, where the POS 14 cannot proactively inform the Qkr Server 10' when to automatically charge for an order.

The use of menu items with special (reserved) identifiers and a specific charge also has other applications in a PAT environment.

For example, groups of customers may decide to order food and/or drinks in rounds.

In this case, after receiving an order for items X,Y,Z and entering the order at the POS 14, step 216, a waiter can select a "Round" menu item. In response to such a selection an item such as "QkrRound=0.00" can be added to an order.

It will be seen that this functionality could also be built into other aspects of the POS application and for example, if a waiter selects an "Order" button from a POS application user interface, UI, this could cause a "QkrRound=0.00" item to be added to an order.

Figure 7:
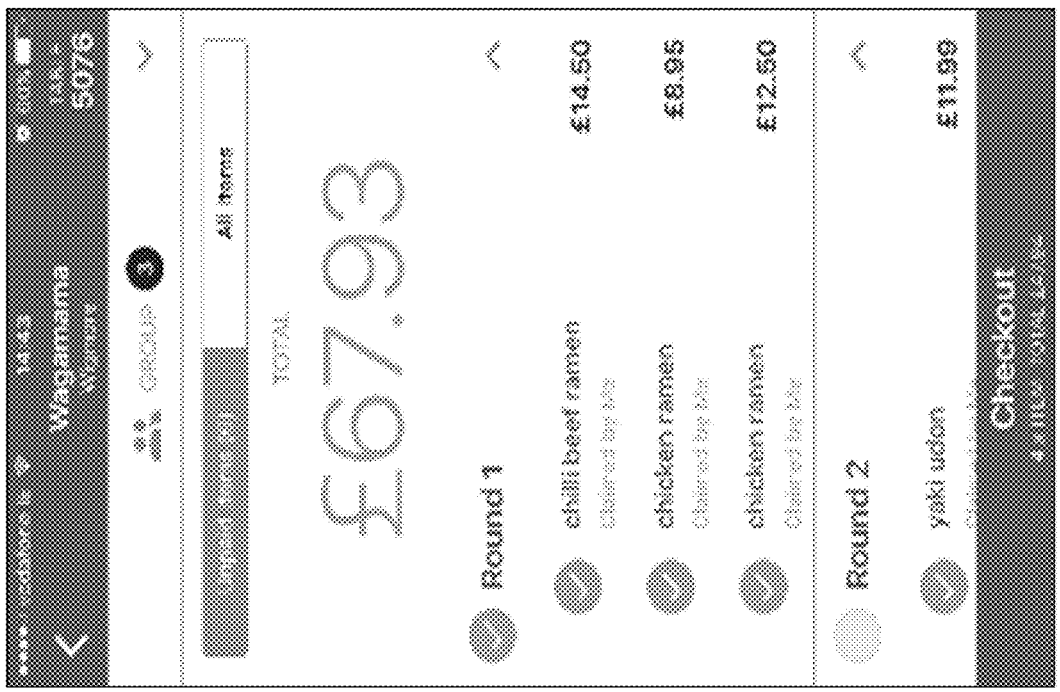

Now when such an order item is subsequently picked up by the Qkr Server 10', it enables the server to group items for a given round together and provide the order items in a grouped format for display on customer device(s) 12 associated with the order, for example, as shown in FIG. 7.

Now at step 222, a user can select items grouped by round for payment and pay the sub-total accordingly at steps 224-230. Of course these items could also be automatically charged as before, if otherwise not paid for.

It will be appreciated that as well as for the automatic charging and round designation functions disclosed above, other special identifiers along with specific amounts can be used for extending the functionality of the POS terminal 14 and QKR server 10' as required and without needing to re-engineer POS functionality.

It will be seen that the above described functionality for automatic charging and round designation can be implemented on POS systems whether or not they have already been specifically engineered to implement automatic charging, such as those provided by Comtrex Systems.

Finally, it will be seen that as well as being performed by an independent Qkr server 10' providing a single portal to various premises operated by different independent merchants, the functionality can also be incorporated within a dedicated PAT application for a specific merchant. In this case, the functionality for the server 10' could be made available by an independent provider of the server 10' to a separate specific merchant server which in turn communicates with connected POS terminals by exposing the required API's to the specific merchant server, so avoiding the need for the merchant to re-implement the Qkr server functionality independently. As such, the expression "server" is used in this specification to mean both a single server and groups of servers provided by one or more parties to provide the functionality described.

The invention claimed is:

1. A server for processing a tab for a customer at a merchant premises, the server being configured to:

provide a list of candidate merchant premises to a customer mobile device;

receive from the customer mobile device, a signal indicating a selection of a selected merchant premises of the candidate merchant premises on said list;

receive payment card details for the customer mobile device;

obtain a specific code for a tab at the selected merchant premises;

send to the customer mobile device said specific code;

receive a signal from a Point of Sale (POS) terminal of said selected merchant premises, indicating entry of said specific code into said POS terminal;

based on the specific code, associate said customer mobile device with an open tab maintained by said POS terminal, said open tab comprising at least one identifier and an amount for each of at least one purchase of said customer at said selected merchant premises;

receive from said POS terminal said at least one identifier and the amount for each purchase of said open tab;

responsive to one of said received at least one identifier comprising a specific identifier and a specific amount indicating that a user of said POS terminal wishes to close said tab, request payment of at least a portion of a balance of said open tab from a payment gateway using said payment card details; and responsive to receiving notification of said payment, notify said POS terminal of said payment.

2. A server according to claim 1 which is responsive to at least one of said at least one identifier comprising at least one previous identifier and amount relate to a round of purchases, to group said at least one previous identifier into a round and provide an indication to said customer mobile device;

receive a request for payment of at least one round of purchases from a requesting customer mobile device;

request payment corresponding to said at least one round of purchases from a payment gateway using payment card details for said requesting customer mobile device; and responsive to receiving notification of said payment, notify said POS terminal of said payment.

3. A server according to claim 1 further comprising one or more of:

checking the validity of said payment card details with a $3^{rd}$ party service; or pre-authorising a payment amount for said payment card, prior to sending to the customer mobile device said specific code.

4. A server according to claim 1 wherein said specific amount is one of: a zero amount; a null value; or an invalid amount which does not affect a balance for said open tab.

5. A server according to claim 1 configured to receive a geo-spatial location of a customer mobile device from said customer mobile device and to provide said list of candidate merchant premises based on their proximity to said geo-spatial location.

6. A server according to claim 1, wherein the specific code comprises one of a numerical code; an alpha-numeric code or a Quick Response (QR) code.

7. A method for processing a tab for a customer at a merchant premises comprising:

providing a list of candidate merchant premises to a customer mobile device;

receiving from the customer mobile device, a signal indicating a selection of a selected merchant premises of the candidate merchant premises on said list;

receiving payment card details for the customer mobile device;

obtaining a specific code for a tab at the selected candidate merchant premises;

sending to the customer mobile device said specific code;

receiving a signal from a Point of Sale (POS) terminal of said selected merchant premises, indicating entry of said specific code into said POS terminal;

based on the specific code, associating said customer mobile device with an open tab maintained by said POS terminal, said open tab comprising at least one identifier and an amount for each purchase of said customer at said selected merchant premises;

receiving from said POS terminal said at least one identifier and the amount for each purchase of said open tab;

responsive to one of said received at least one identifier comprising a specific identifier and a specific amount indicating that a user of said POS terminal wishes to close said tab, requesting payment of at least a portion of a balance of said open tab from a payment gateway using said payment card details; and responsive to receiving notification of said payment, notifying said POS terminal of said payment.

8. A computer program product comprising a non-transitory computer readable medium on which instructions are stored which, when executed on a computer system, are configured for performing the steps of claim 7.

9. The method of claim 7, wherein said specific amount is one of: a zero amount; a null value; or an invalid amount which does not affect a balance for said open tab.

10. The method of claim 9, wherein said specific amount is the zero amount.

11. The method of claim 9, wherein said specific amount is the null value.

12. The method of claim 9, wherein said specific amount is the invalid amount.

13. The method of claim 9, wherein the specific amount is different from each of a value of the portion of the balance of said open tab and the specific code, wherein the specific amount is a null value, or an invalid amount.

14. A server according to claim 4, wherein said specific amount is the zero amount.

15. A server according to claim 4, wherein said specific amount is the null value.

16. A server according to claim 4, wherein said specific amount is the invalid amount.

17. A server according to claim 1, wherein the specific amount is different from each of a value of the portion of the balance of said open tab and the specific code, wherein the specific amount is a null value, or an invalid amount.

* * * * *

UNITED STATES PATENT AND TRADEMARK OFFICE
CERTIFICATE OF CORRECTION

PATENT NO. : 10,909,520 B2  
APPLICATION NO. : 16/009361  
DATED : February 2, 2021  
INVENTOR(S) : Tutte et al.

Page 1 of 1

It is certified that error appears in the above-identified patent and that said Letters Patent is hereby corrected as shown below:

On the Title Page

Item (30), delete "17176422" and insert --17176422.8-- therefor.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*